Feb. 25, 1969   J. W. EERKENS   3,430,046
COHERENT GAMMA RAY EMITTER
Filed June 23, 1966   Sheet 1 of 2

INVENTOR.
JOZEF W. EERKENS
BY Fulwider, Patton, Rieber,
Lee, and Utecht
ATTORNEYS

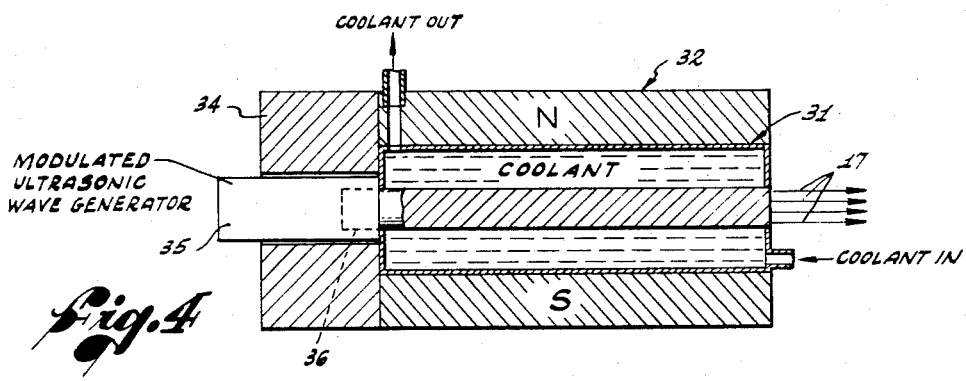
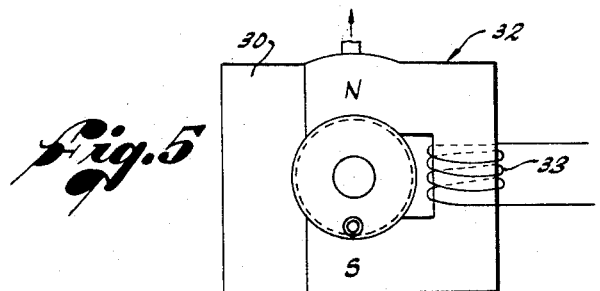
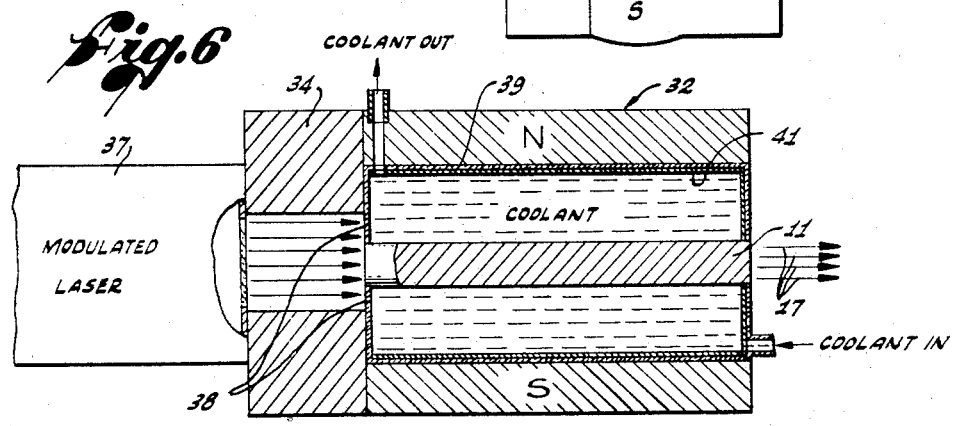
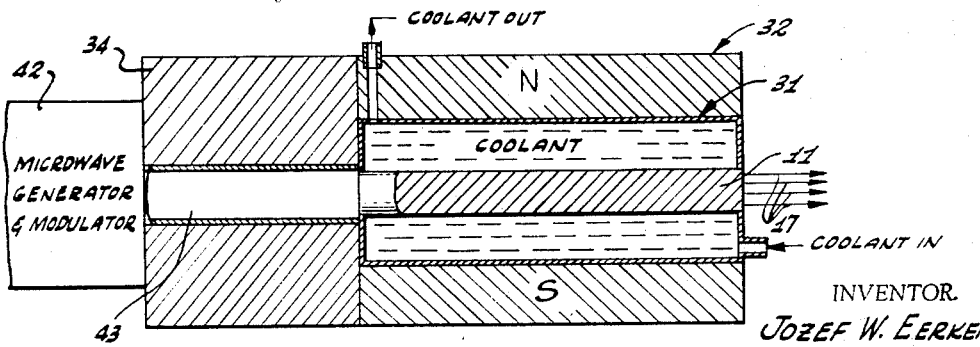

United States Patent Office 3,430,046
Patented Feb. 25, 1969

3,430,046
COHERENT GAMMA RAY EMITTER
Jozef W. Eerkens, Los Angeles, Calif., assignor to Terra Nova Incorporated, Los Angeles, Calif., a corporation of California
Continuation-in-part of application Ser. No. 196,282, May 21, 1962. This application June 23, 1966, Ser. No. 559,802
U.S. Cl. 250—84                        15 Claims
Int. Cl. H01j 39/12

ABSTRACT OF THE DISCLOSURE

An emitter for coherent gamma rays comprising an elongated rod of a length-to-diameter ratio in excess of five and preferably between ten and twenty, containing a radioactive isotope of the Mossbauer type. The rod is cooled below the temperature above which the Mossbauer effect therein is substantially suppressed to secure a stimulated emission of gamma rays within the rod and progressive multiplication of gamma rays along the axis of the rod to emit substantially superradiant, directionally coherent gamma rays from an end of the rod. An oscillating magnetic field may be applied axially of the rod at a radio frequency to bring the interaction between an excited nucleus and a conversion electron into substantial resonance to enhance the deexcitation rate between energy states of the excited nucleus and to introduce at least radio frequency time coherence into the emitted gamma ray beam. Means is disclosed to apply a steady magnetic field transversely to the axis of the rod to orient the nuclei of the radioisotope and cause the gamma rays to be emitted in preferred directions perpendicular to the direction of the field thereby securing a gain in directional coherence of the emission along the axis of the rod. Instead of the oscillating magnetic field the decay rate of the radioisotope may be controlled by the application of monochromatic ultrasonic waves or an electromagnetic beam of a wavelength to bring the internal conversion process of excited nuclei into a resonant condition, the electromagnetic beam being generated by a laser or a microwave generator. Modulation of the various control means for the decay rate of the radioisotope effects modulation of the emitted gamma ray beam.

---

This application is a continuation-in-part of application Ser. No. 196,282, filed May 21, 1962 for Coherent Gamma Ray Emitter, now abandoned.

The present invention relates generally to devices for emitting a beam of gamma rays from radioisotopes by the stimulated emission of gamma rays from radioactive nuclei, that is by nuclear maser action, and more particularly to such a device in which the beam is at least partially coherent and is controllable and modulatable.

A directionally coherent and partially phase coherent beam of gamma rays, known as a superradiant beam of gammas, may be secured from a rod of radioactive gamma ray emitting material in which there is stimulated emission of gamma rays from radioactive nuclei in a manner analogous to the stimulated emission of excited photons in lasers. The gamma ray emitting material is a radioactive isotope in the form of a long thin rod having a length to diameter ratio of at least 5 and preferably greater, in order to secure appreciable stimulated emission of gamma rays of coherent form. The $L/D$ ratio of 5 is not a critical lower value but is a practical one below which the coherent gamma ray emission is not considered significant. There is no upper limit to the $L/D$ ratio, a value of 40 or more being theoretically desirable, but for practical purposes it has been found that a ratio between 10 and 20 is desirable to secure significant coherent gamma ray emission with dimensions which may be handled from the standpoint of practicality and economy. Specific examples are rods 4 millimeters in diameter and 50 millimeters long, and 1 millimeter in diameter and 20 millimeters long. To secure a coherent or superradiant beam of gamma rays by stimulated emission from excited nuclei it is necessary that the frequency of the emitted gamma rays be monochromatic so that they fall within the resonance width of the excited nuclei and this occurs in gamma emitting radioisotopes of the class known as Mossbauer-effect radioisotopes, or simply Mossbauer radioisotopes of which examples are Co–57 (Fe–57), Sm–119 (Sm–119m), Os–191 (Ir–191), Ta–182 (W–182), Tm–171 (Yb–171). Co–60 (Co–60m), Kr–85 (Kr–85m), and many others, the daughter resonant absorption nucleus being given in parenthesis.

For the Mossbauer radioisotope to experience stimulated emission of gamma rays it should be cooled below the temperature above which the Mossbauer effect is substantially suppressed, which temperature varies with the different radioisotopes, usually falling between 20° K. and 280° K. Thus for Co–57, Co–60 and Sn–119 the coolant temperature should be 20° K.–100° K., and for Tm–171 and Os–191, 70° K.–280° K. Cooling is required not only to prevent suppression of the Mossbauer effect but also to prevent the radioisotope self-heating to the point of structural destruction.

The Mossbauer radioisotopes usually in compound forms such as oxides or fluorides, formed into a long cylindrical rod and cooled below the temperature above which the Mossbauer effect is substantially suppressed, emit a superradiant beam of gamma rays out of both ends of the rod due to the progressive multiplication of gamma rays by the stimulated emission process (nuclear masing or "grasing") as the gamma rays travel in directions parallel to the axis of the rod. For off-axis directions the build-up of gamma rays by multiplication either does not occur or terminates when the gamma rays pass through the sides of the rod.

A more sophisticated emitter of coherent gamma rays according to the present invention deals with artificial control of the decay rate of the radioisotope by enhancement or decrease of nuclear emission in phase with an imposed signal. This adds time coherence to the emitted gamma rays, and by control of the beginning and the end and the intensity of the enhanced or decreased emission, modulation of the gamma ray emission. In general, a nuclear excited state will decay from a higher energy level to a lower level with the emission of a gamma ray but this decay is constrained by certain selection rules between the levels, as will be explained hereinafter. To enhance the de-excitation rate of radioisotopes artifically, several arrangements may be applied of which a preferred is to subject the radioisotope rod to an oscillating electromagnetic field with a frequency approximately equal to $E_{2-3}/h$ where $E_{2-3}$ is the energy difference between a metastable state and a nearby intermediate nuclear state of different spin, which plays the role of an activation energy for de-excitation, analogous to the activation energy in chemical reactions, and $h$ is Planck's constant. The field at this frequency will cause the de-excitation rate from the long-lived metastable energy state through the intermediate state to a lower energy level to be enhanced. The spin directions of excited nuclei will "turn" or "flip-flop" out of phase with those of the electron clouds under the action of an oscillating electromagnetic field. At the proper frequency this effect will increase the probability that the metastable nucleus will change its spin to such a value that it can rapidly decay to a lower-lying energy state and therefore increase the decay rate and enhance the emission of gamma rays above normal decay and emission. This change in spin is usually aided by an inner-shell electron which carries away some or all of the transition energy. This latter process is often referred to as an "internal conversion process," and it is usually this process whose rate is enhanced by the action of the oscillating electromagnetic field. When the frequency equals $E_{2-3}/h$ approximately, this enhancement will be strongest and the frequency is called "resonant." Modulation of the intensity of the electromagnetic field will effect modulation of the emitted gamma ray beam.

For nuclides with very small values of $E_{2-3}$, the frequency given by $E_{2-3}/h$ lies in the radio frequency region and therefore in one arrangement a radioisotope rod is placed inside a radio frequency coil such that it is coaxial therewith. Electric currents fed to the coil at a frequency approximately equal to $E_{2-3}/h$ will then cause accelerated de-excitation of the radioisotope as described above.

Although a steady magnetic field is not necessary in order to achieve this frequency induced de-excitation, the presence of a strong transverse magnetic field will orient the nuclei and will cause the gamma rays to be emitted in preferred directions perpendicular to the direction of the field and thus along the axis of the rod.

The use of a coaxial radio frequency coil and a steady transverse magnetic field results in an apparatus which, coincidentally only, resembles a nuclear magnetic resonance instrument. However, the operational parameters used for coherent gamma ray generation are quite different from those used in nuclear magnetic resonance work and the underlying physical principles are quite different. In nuclear magnetic resonance work the main object is the determination of the value of the nuclear spin J of a nuclear isotope which may or may not be radioactive. The spin J is determined by studying the absorption spectrum of radio frequency power as a function of radio frequency $f$ in the neighborhood of $$f = \frac{g\mu_0 H}{h}$$

where $g$ is the spectroscopic splitting factor of the nuclide and $\mu_0$ is the nuclear magnetron. H is the magnetic field and $h$ is Planck's constant. The frequency given by this equation for nuclear magnetic resonance work bears no relation to the frequency used for inducement of radioisotopic decay although, for certain materials, the frequencies may coincidentally have similar values. It will therefore be seen that while the structure used in an emitter according to this invention for the production and control of a superradiant beam of gamma rays may superficially resemble that used in nuclear magnetic resonance instruments, the operational frequency and the effect of nuclear masing and stimulated coherent gamma ray production is quite different.

Another modification of this invention lies in inducing nuclear decay in a cooled Mossbauer radioisotope rod by the application of ultrasonic frequencies thereto from an ultrasonic wave generator such as a piezoelectric crystal or a phonon maser which will vibrate at frequencies generally in the range of 1 to 10,000 gigacycles/sec. Modulation of the intensity of the ultrasound will effect modulation of the emitted coherent gamma ray beam. The ultrasonic application may be used with or without a nucleus-orienting transverse, steady, magnetic field. This ultrasonic application may be in place of or in addition to the use of the coaxial radio frequency coil. The ultrasonic frequency to be used should again equal $E_{2-3}/h$ approximately, where $E_{2-3}$ depends on the particular radioisotope that is used. In this arrangement, the radioisotope rod should preferably be of crystalline form with a lattice which will efficiently transmit sound at the frequency used.

In still other modifications of this invention, the Mossbauer radioisotope in a transparent crystalline form is formed into a long rod, cooled, and subjected to a beam of monochromatic light or laser photons or the rod is placed in or at the end of a microwave cavity. These modifications are desired when the frequency given by $E_{2-3}/h$ falls in the microwave or optical range. The microwaves or optical photons should reach the nuclei in the solid rod without being excessively absorbed by atomic interactions and, hence, it is desirable that the solid state lattice of the rod material be transparent to the particular electromagnetic frequency being used. Modulation of the supplied electromagnetic energy will effect modulation of the emitted coherent gamma ray beam.

It is therefore a primary object of the present invention to provide an improved coherent gamma ray emitting device;

Another object of this invention is the provision of an improved gamma ray emitting device employing a long rod of excited radioisotope material in which there is stimulated emission of gamma rays from radioactive nuclei thus causing progressive multiplication of the gamma rays which travel parallel to the axis of the rod, analogously to the photons in a maser or laser;

Another object of this invention is the provision of an improved gamma ray emitting device employing an elongated rod of a Mossbauer radioisotope cooled below a temperature above which the Mossbauer effect is substantially suppressed and in which a substantially coherent beam of gamma rays is emitted from an end of the rod;

A further object of this invention is the provision of an improved device for controllably emitting coherent gamma rays comprising an elongated rod of a Mossbauer radioisotope cooled below the temperature at which the Mossbauer effect is substantially suppressed, in which emission is controlled by the application of a coaxial radio frequency field of a frequency to bring the internal conversion process into a resonant situation;

A still further object of this invention is the provision of an improved gamma ray emitting device in accordance with the preceding object in which the Mossbauer radioisotope rod is further subjected to a strong, transverse steady magnetic field;

Yet another object of this invention is the provision of an improved controllable coherent gamma ray emitting device employing an elongated rod of a Mossbauer radioisotope cooled below the temperature at which the Mossbauer effect is suppressed and in which the rod is subjected to controlled axial ultrasonic frequencies of a value to bring the internal conversion process into a resonant situation;

Still another object of this invention is the provision of an improved controllable coherent gamma ray emitting device employing an elongated rod of a Mossbauer radioisotope in a transparent crystalline matrix, the rod having an $L/D$ ratio lying substantially between 5 and 40, in which the rod is cooled below the temperature at which the Mossbauer effect is substantially suppressed, the rod being subjected to a beam of electromagnetic energy of a frequency to bring the internal conversion process into a resonant situation.

These and other objects and features of the invention will be readily apparent to those skilled in the art from the following specification and the appended drawing in which:

FIGURE 4 is a diagrammatic representation of a coherent gamma ray emitter according to this invention employing ultrasound to enhance the natural emission rate;

FIGURE 5 is an end elevational view of any of FIGURES 2, 4, 6 and 7;

FIGURE 6 is a diagrammatic representation of a coherent gamma ray emitter according to this invention employing a photon beam to enhance the natural emission rate; and FIGURE 7 is a diagrammatic representation of a coherent gamma ray emitter according to this invention employing microwaves to enhance the natural emission rate.

Figure 1:
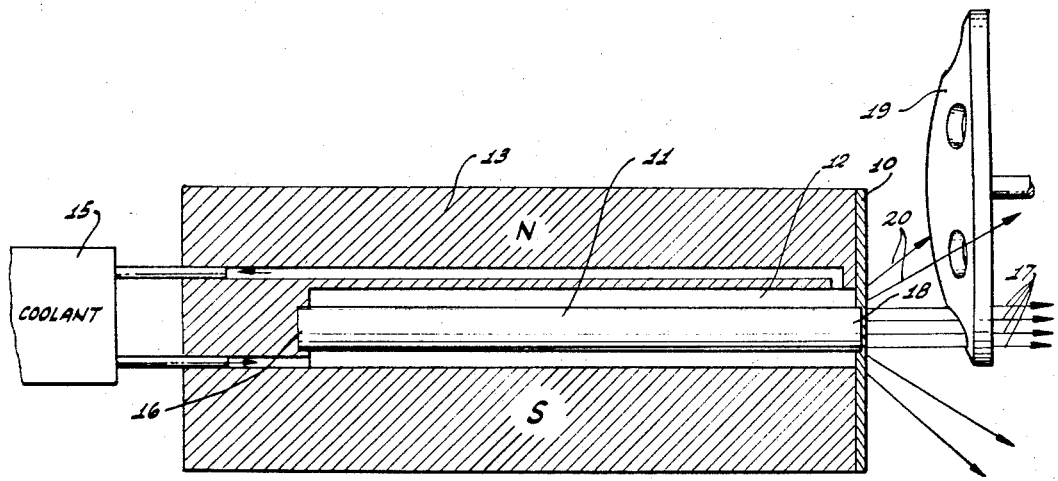
FIGURE 1 is a diagrammatic representation of one form of a coherent gamma ray emitter device according to the present invention.

FIGURE 1 illustrates a less complicated form of coherent gamma ray emitting device according to the present invention. An elongated rod 11 containing a Mossbauer radioisotope is mounted within a cavity 12 in a shield 13 of lead or other shielding material, the cavity being closed by a front plate 10 which also supports the front end of the rod. A coolant from a supply 15 is circulated through the cavity 12 to cool the rod 11. The coolant, which may be, for example, liquid nitrogen, maintains the temperature of the rod 11 below the value above which the Mossbauer effect is substantially suppressed. Gamma rays emitted from the end 16 of the rod 11 will be absorbed in the shield 13. Gamma rays emitted at 17 from the unshielded end 18 of the rod 11 will be in the form of a coherent beam which may be modulated by beam chopping means such as a perforated rotating wheel 19 placed in the path of the beam. This will be a superradiant, directionally coherent and partially phase coherent beam of gamma rays produced by progressive multiplication by stimulated emission from those gamma rays which travel parallel to the axis of the rod 11.

As has previously been described, the Mossbauer radioisotope emits gamma rays of monochromatic frequency so that they fall within the resonance width of the excited nuclei. With the isotope cooled below the temperature at which the Mossbauer effect is substantially suppressed, stimulated emission of excited nuclei thereby occurs within the rod and due to progressive multiplication of the gamma rays by the stimulated emission process along the axis of the rod, there is emitted from the end 18 a superradiant beam of gamma rays 17 which is directionally coherent and at least partially phase coherent.

As a specific example, the Mossbauer radioisotope can be Co–57 which decays with a 267 day half-life to Fe–57m. Fe–57m (isomer) has a half-life $10^{-7}$ seconds and decays to normal Fe–57 upon emission of a gamma of 15 kev. energy. As previously stated, the greater the $L/D$ ratio of the rod 11 the more superradiant the gamma ray beam emitted. However, for practical considerations stimulated emission below an $L/D$ ratio of 5 is not sufficiently significant to be important, and above 40 the construction of the rod becomes impractical and uneconomical. Preferably the $L/D$ ratio of the rod from such practical and economic consideration lies between 10 and 20.

Figure 2:
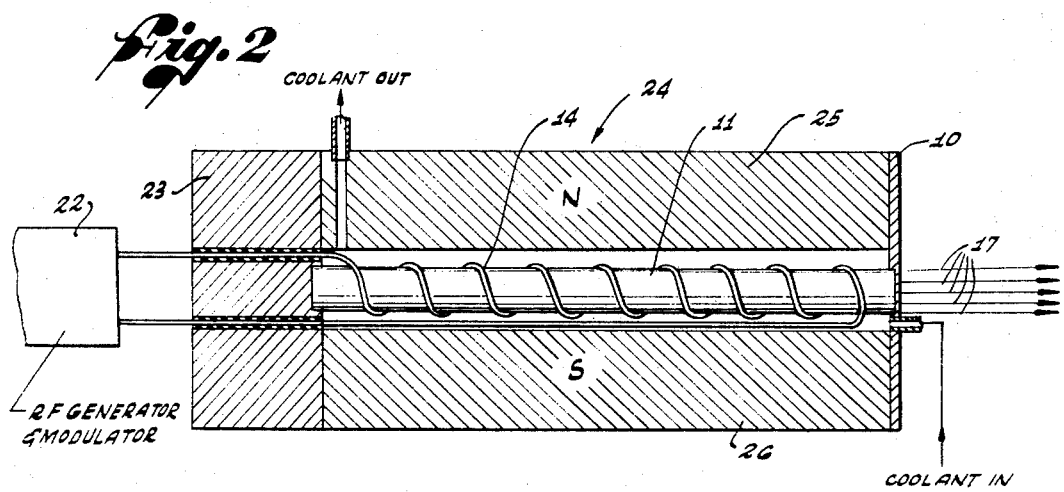
FIGURE 2 is a diagrammatic representation of another form of coherent gamma ray emitter according to the present invention.

The basic structure so far described for FIGURE 1 may form in and of itself a complete coherent gamma ray beam emitter. It may be made more sophisticated by the provision of means for controlling the decay rate of the Mossbauer radioisotope of the rod 11 by the application of a radio frequency field thereto as shown in FIGURE 2, or the exposure of the rod 11 to ultrasonic waves as shown in FIGURE 4; exposure to a photon beam as shown in FIGURE 6; or exposure to microwaves as shown in FIGURE 7. For a consideration of artificial control of the decay rate of the radioisotope by the enhancement or decrease of nuclear emission over the natural decay rate, reference is made to FIGURE 3.

In general, a nuclear excited state will decay from a higher energy level to a lower level with the emission of a gamma ray but this decay is constrained by certain selection rules between the levels. One of these selection rules is that the order $\lambda$ of the multipole radiation be such that $J_i + J_f \leq \lambda \leq (J_i - J_f)$, where the subscripts $i$ and $f$ stand for the initial and final state of the transition, and J stands for the nuclear spin. Another selection rule forbids the transition from a state with spin $J=0$, shown in FIGURE 3 as a metastable state 2, to another lower-lying state where $J=0$, such as state 1 in FIGURE 3. Even though energetically a direct transition from state 2 to state 1 is feasible, angular momentum conservation forbids it.

Figure 3:
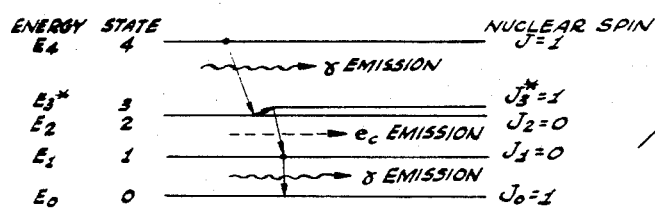
FIGURE 3 is a representation of nuclear energy levels and spin states of excited nuclei in stimulated gamma ray emission according to the present invention.

For an excited nucleus in the metastable state 2 to de-excite to the lower state 1, the nucleus must first go to an intermediate state with spin $J=1$, shown in the example of FIGURE 3 as state 3 which is close in energy to state 2. The extra energy and momentum required for the intermediate transition from state 2 to state 3 is, in naturally decaying radioisotopes, usually supplied by an inner core (K, L or M shell) electron of the atom of which the nucleus forms a part. This process whereby an inner orbit electron "helps" the excited nucleus to get over the "hurdle" which is represented by the angular momentum or energy difference $J_{2-3}$ equals $J_3-J_2$ or $E_{2-3}=E_3-E_2$, is called "internal conversion" in nuclear physics and is well known in the art. Usually a particular orbital electron in the K, L or M shell which is denoted as $e_c$ in FIGURE 3, possesses the most suitable relative energy, momentum and spin to assist the nucleus in going from state 2 to state 1 by way of state 3. In its natural state a radioisotope in state 2 will therefore de-excite by way of random internal conversion events. These de-excitations have half-lifes of for example 16 days for Os–191, 267 days for Co–57, and 1.9 years for Tm–171. To enhance the de-excitation rate of radioisotopes in state 2 artificially, it is desired to supply the nucleus-electron core system with a quantum of energy equal to the nuclear activation energy $E_{2-3}$ of interaction between the nucleus and core electrons.

One way of providing this activation energy is to supply the electron-conducting coil 11 with radio frequency energy of a frequency approximately equal to $E_{2-3}/h$ where $h$ is Planck's constant and $E_{2-3}$ is the energy difference between state 2 and state 3 in FIGURE 3. With the application of energy of this frequency the interaction between the nucleus and the conversion core electron can be brought into substantial resonance and the de-excitation rate from state 2 to state 1 by way of state 3 enhanced. The reason for this is that the radio frequency field will cause the radionuclide moments and the electron moments to oscillate and since there is a different lag between the nucleus and the core electrons in following the oscillations, changes in their relative angular-momentum-associated energies will result which will bring the internal conversion process into closer resonance.

If in a subsequent radionuclide de-excitation from state 1 to state 0 in FIGURE 3 a gamma ray is emitted, the effective emission rate of this gamma ray from the mother radioisotope is also enhanced. By pulsing or modulating the intensity of the impressed resonant electromagnetic energy, the emitted gammas are modulated and thus the emission is controllable and modulatable in time. Since the rod 11 is a gamma ray multiplying Mossbauer radioisotope there is also directional coherence in the emitted gamma ray beam 17 since the emitted gamma rays multiply along the axis of the rod 11 by stimulated emission.

The arrows 20 indicate that there is some stray gamma ray emission in all directions not cut off by shielding which does not form a part of the superradiant, coherent beam of gamma rays 17 which is emitted axially of the rod 11 and which has been built up by the progressive multiplication of gamma rays by the stimulated emission process of nuclear masing in the travel of gamma rays parallel to the axis of the rod.

FIGURE 2 shows a controllable coherent gamma ray emitter according to the present invention which, coincidentally only, takes the form of a nuclear magnetic resonance instrument. The elongated rod 11 contains a Mossbauer radioisotope, again cooled by a coolant circulating through the cavity 12 and is positioned inside a conducting coil 14 which is supplied with radio frequency energy from a source 22.

The rear end of the rod 11 is shielded at 23 by lead or other material, and a strong magnetic field is applied transversely to the axis of the rod 11 by a magnet 24, which may be either a permanent magnet or an electromagnet, having poles at opposite sides of the rod; for example, a north pole 25 and a south pole 26, as illustrated in FIGURE 2. For very strong magnetic fields, it may be desirable to go to superconducting-coil electromagnet techniques to secure fields of the order of 100,000 gauss.

Although a steady magnetic field is not necessary to achieve radio frequency induced de-excitation, and thus controllable or modulation-coherent gamma ray emission, the presence of such a strong magnetic field orients the nuclei and causes the gamma rays to be polarized and to be emitted in preferred directions perpendicular to the direction of the field and thus along the axis of the rod 11. This results in a gain in directional or spatial coherence of the gamma ray emission. Modulation of the radio frequency energy will again effect like modulation of the emitted gamma ray beam.

The operational parameters used for coherent gamma ray generation according to the present invention are quite different from those used in nuclear magnetic resonance work, and the underlying physical principles are quite different. This is emphasized by the different factors involved in determining the different frequencies used in the coherent gamma ray emitter and in nuclear magnetic resonance instrument. While the optimum frequency for a coherent gamma ray emitter may be similar to the frequency used in some nuclear magnetic resonance work, this is only coincidental, as is shown by the different factors used to determine it.

Artificial control of the decay rate of the Mossbauer radioisotope in the rod 11 may be secured by application of ultrasonic frequencies thereto. This ultra sound may be used in place of, or in addition to, the radio frequency coil technique. In the use of ultra sound the rod 11 should preferably be made of crystalline form with a lattice which will efficiently transmit sound at the operating frequency which is again given by the energy equation $E_{2-3}/h$. Due to the different mass of the nucleus and electrons, the internal conversion process can again to brought into better resonance, resulting in induced gamma ray emission. By varying the intensity of the ultra sound, the emission can be time-controlled and modulated as before.

An emitter employing supersonic control of the decay rate is shown in FIGURES 4 and 5. A Mossbauer radioisotope rod 11 is provided with a cooling jacket 31 through which a coolant such as liquid nitrogen may be circulated. A transverse steady magnetic field may optionally be supplied by an electromagnet 32 having an energizing coil 33. A back shield of lead or other material is provided at 34 and a side shield at 30, the magnet also serving as shielding material. An ultrasonic wave generator and modulator is shown at 35. The wave generator may be a piezoelectric crystal, phonon maser, or other source of sound vibrations, having frequencies, by way of example, of the order of 10–1,000 gigacycles/sec. The rod 11 may by way of example be 1 millimeter in diameter and 20 millimeters long and made of Co–60 oxide. The ultra sound is applied axially to the back end 36 of the rod 11.

FIGURES 6 and 7 show other means for controlling or modulating the gamma ray emission according to this invention. In both the Mossbauer radioisotope rod 11 has the $L/D$ relationship previously expressed and is cooled below the critical temperatures at which the Mossbauer effect in the radioisotope used is substantially suppressed. The cooling in both cases is effected by enclosing the rod in a jacket through which may be circulated a cryogenic fluid such as liquid nitrogen or the like in contact with rod 11. The electromagnet 32 may be omitted in each case, and where used functions the same as in FIGURES 2 and 4.

In FIGURE 6, the Mossbauer radioisotope rod 11 is subjected to a beam of laser photons or a monochromatic light beam. What photon frequency $f$ is used will depend on the value of $E_{2-3}/h$. This frequency $f$ will bring the internal conversion process into a resonant situation. The optical photons should reach the nuclei of the rod 11 without being excessively absorbed by atomic interactions and hence, the solid-state lattice of the rod material should be transparent to the particular photon frequency being used. FIGURE 6 illustrates a laser at 37 whose photon beam is modulated and directed at the back end of the rod 11 and through an annular window 38 in the back end of a transparent coolant-enclosing shell 39. The outer and front interior walls of the shell 39 are preferably aluminized or otherwise mirrored at 41 to reflect stray photons to the rod surface. A specific example for the FIGURE 6 configuration is a Tm–171 oxide or fluoride rod, 1 millimeter in diameter and 10–20 millimeters long. The laser can be a carbon dioxide-nitrogen pumped gas laser emitting 10.6 micron photons.

FIGURE 7 shows an emitter modification according to the present invention in which a cooled Mossbauer radioisotope rod is subjected to microwaves. A microwave generator and modulator at 42 transmits through a wave guide 43 to the back end of the rod 11. The microwave frequency is again determined from the energy state equation to bring the internal conversion process into a resonant condition. A typical example for the FIGURE 7 configuration is a rod of Cobalt 57 oxide, 1 millimeter in diameter and 10–20 millimeters long, using a microwave frequency of 80–150 gigacycles/sec. Modulation of the microwave generator output will effect modulation of the emitted gamma ray beam.

The coherent or superradiant beam of gamma rays emitted by the devices of this invention and indicated by the numeral 17 can be used in many applications, whether or not modulated. Where modulated, it is particularly useful in communications. Otherwise, it is useful in radiation weaponry, in the melting and evaporation of materials for the purpose of welding, cutting, machining, removal, plating, and other known uses for concentrated beams of energy, surgery, holographs, the ignition of nuclear fusion and others, and while certain preferred embodiments of the invention have been specifically illustrated and described herein, it is understood that the invention is not limited thereto, as many variations will be apparent to those skilled in the art, and the invention is to be given its broadest interpretation within the terms of the following claims.

I claim:
1. An emitter for coherent gamma rays comprising: a rod having a length to diameter ratio in excess of 5, said rod containing a radioactive isotope having substantially the characteristics of a Mossbauer radioisotope; and means for cooling said rod below the temperature above which the Mossbauer effect therein is substantially suppressed to secure stimulated emission of gamma rays within the rod and progressive multiplication of gamma rays along the axis of the rod to emit substantially superradiant, directionally coherent gamma rays from an end of said rod.

2. The gamma ray emitter defined in claim 1 in which said rod has a length to diameter ratio substantially between 10 and 20.

3. The gamma ray emitter defined in claim 1 including: means applying to said rod an oscillating magnetic field axially of said rod at a radio frequency to bring the interaction between an excited nucleus and a conversion electron into substantial resonance to enhance the de-excitation rate between energy state of the excited nucleus and to introduce at least radio frequency time coherence into the emitted gamma ray beam.

4. The gamma ray emitter defined in claim 3 including: means to apply a steady magnetic field substantially transversely of the axis of the rod to orient the nuclei of the radioisotope and cause the gamma rays to be emitted in preferred directions perpendicular to the direction of the field to secure a gain in directional coherence of the gamma ray emission along the axis of the rod.

5. The gamma ray emitter defined in claim 1 including: means for applying monochromatic ultrasonic waves to the end of said rod opposite the gamma ray emitting end to control the decay rate of the radioisotope, said rod being of a crystalline form whose lattice will efficiently transmit sound at the applied frequency.

6. The gamma ray emitter defined in claim 5 in which the frequency of the ultrasound is a function of the energy required to enhance the decay of the excited nucleus of the radioisotope from a metastable energy state to a lower energy state through an intermediate energy state by internal conversion with the help of a core electron.

7. The gamma ray emitter defined in claim 1 including: means for subjecting said rod to an electromagnetic beam of a wavelength to enhance the emission of gamma rays by bringing the internal conversion process of excited nuclei into a resonant condition.

8. The gamma ray emitter defined in claim 7 in which the wavelength of said electromagnetic beam is in the optical range and is generated by a monochromatic light source.

9. The gamma ray emitter defined in claim 7 in which said electromagnetic beam is in the microwave range and is transmitted to the end of said rod opposite the gamma ray emitting end by a wave guide.

10. The gamma ray emitter defined in claim 7 including: a modulator for said electromagnetic beam to effect modulation of the emitter gamma ray beam.

11. The gamma ray emitter defined in claim 7 including: means to apply a steady magnetic field substantially transversely of the axis of said rod to orient the nuclei of the radioisotope.

12. The gamma ray emitter defined in claim 3 including: a modulator for said radio frequency to effect modulation of the emitted gamma ray beam.

13. The gamma ray emitter defined in claim 5 including: means to apply a steady magnetic field substantially transversely of the axis of said rod to orient the nuclei of the radioisotope.

14. The gamma ray emitter defined in claim 5 including: means to modulate the intensity of the ultrasound to effect modulation of the emitted gamma ray beam.

15. The gamma ray emitter defined in claim 1 including: means to apply a steady magnetic field substantially transversely of the axis of the rod to orient the nuclei of the radioisotope and cause the gamma rays to be emitted in preferred directions perpendicular to the direction of the field to secure a gain in directional coherence of the gamma ray emission along the axis of the rod.

References Cited
UNITED STATES PATENTS

| | | | |
|---|---|---|---|
| 3,085,157 | 4/1963 | Ginsburgh et al. | 250—106 |
| 3,130,254 | 4/1964 | Sorokin et al. | 331—94.5 |
| 3,193,683 | 7/1965 | Reiffel | 250—106 |
| 3,223,842 | 12/1965 | Hyde | 250—106 X |

OTHER REFERENCES

The Mossbauer Effect: A Tool for Science, by G. K. Westheim, from Nucleonics, vol. 19, No. 1, January 1961, pp. 52–57.

ARCHIE R. BORCHELT, *Primary Examiner.*

U.S. Cl. X.R.

250—106